United States Patent
Soroushi (10) Patent No.: US 7,506,133 B2
(45) Date of Patent: Mar. 17, 2009

(54) METHOD AND APPARATUS FOR HIGH SPEED ADDRESSING OF A MEMORY SPACE FROM A RELATIVELY SMALL ADDRESS SPACE

(75) Inventor: Atousa Soroushi, North Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 600 days.

(21) Appl. No.: 10/644,695

(22) Filed: Aug. 20, 2003

(65) Prior Publication Data

US 2005/0044341 A1   Feb. 24, 2005

(51) Int. Cl.
*G06F 12/00* (2006.01)

(52) U.S. Cl. .................. 711/219; 711/220

(58) Field of Classification Search .......... 711/219, 711/220, 2

See application file for complete search history.

(56) References Cited

U.S. PATENT DOCUMENTS

| | | | | |
|---|---|---|---|---|
| 4,137,565 A | * | 1/1979 | Mager et al. | 710/22 |
| 5,170,477 A | * | 12/1992 | Potter et al. | 711/201 |
| 5,488,709 A | * | 1/1996 | Chan | 711/118 |
| 5,570,306 A | | 10/1996 | Soo | 364/715.11 |
| 5,659,783 A | | 8/1997 | Banno | 395/800.43 |
| 5,732,241 A | * | 3/1998 | Chan | 711/131 |
| 5,767,866 A | | 6/1998 | Chee et al. | |
| 5,809,327 A | * | 9/1998 | Wollan et al. | 712/33 |
| 5,826,057 A | * | 10/1998 | Okamoto et al. | 703/24 |
| 6,158,046 A | * | 12/2000 | Yoshida et al. | 717/151 |
| 6,182,207 B1 | * | 1/2001 | Poivre et al. | 712/225 |
| 6,189,052 B1 | | 2/2001 | Nilsson et al. | 710/48 |
| 2003/0033499 A1 | * | 2/2003 | Chou | 711/220 |
| 2003/0067456 A1 | * | 4/2003 | Low et al. | 345/204 |

* cited by examiner

*Primary Examiner*—Reba I Elmore
(74) *Attorney, Agent, or Firm*—Mark P. Watson (57) ABSTRACT

A method and apparatus for high speed addressing of a memory space from a relatively small address space. An N-bit bus interfaces with a memory device having a $2^M$ address memory space, where M is greater than N. The method and apparatus provide for (a) providing at least two registers, (b) receiving one byte of a plurality of N-bit bytes that together define an address in the memory space, (c) incrementing a count as a result of completing step (b), (d) addressing one of the two registers according to the incremented count in step (c), and (e) storing the one byte in the register addressed in step (d).

10 Claims, 7 Drawing Sheets

(PRIOR ART)

FIG. 3

(PRIOR ART)

METHOD AND APPARATUS FOR HIGH SPEED ADDRESSING OF A MEMORY SPACE FROM A RELATIVELY SMALL ADDRESS SPACE

The invention relates to a method and apparatus for high speed addressing of a memory space from a relatively small address space.

BACKGROUND OF THE INVENTION

A memory or any memory mapped I/O device, such as a printer, a display, a port, or a register is referred to herein as a "memory device." One or more memory devices may be coupled to an N-bit address bus, which can be used to address the memory devices directly. Direct addressing with an N-bit address bus requires that the address space comprise no more than $2^N$ addresses. For example, a typical 8-bit address bus can be used to directly address $2^8$ or 256 locations or addresses in a memory device.

Frequently, more than one memory device is coupled to the bus. Further, the address space not only includes addresses which identify locations in memory, but also addressable locations within other memory devices coupled to the bus. Continuing with the 8-bit address bus example, 200 of the 256 locations may be random access memory locations of a memory chip, with the remaining 56 addresses being used to identify registers or ports in other memory devices. Most memory chips, however, have a capacity that is greater than 256 locations, and most systems have a memory space that is greater than 256. For this reason, a wider address bus is often used. For example, a 16 bit bus can be used to access any location within a memory space of $2^{16}$ or 65,536 ("64K") directly. As another example, the address bus in personal computers today is commonly 36 bits, allowing any location in a 64 GB ($2^{36}$) address space to be addressed directly.

Many systems today are much less complex than a personal computer, however, and many still use a relatively small bus, such as an 8-bit bus. Further, such systems may have only a single bus, used for communicating both address and data. Reasons for the use of a single, relatively small bus include cost and power savings. Hand-held devices, battery-powered portable devices, cellular telephones, and embedded systems are examples of systems that commonly employ a single 8-bit bus. Even though such systems use an 8-bit bus, it is desirable to have an address space greater than 256 addresses in such systems. A technique can be used to access all of the locations in a system having an 8-bit bus even though the address space is greater than 256 addresses. This technique is known as "indirect addressing." The indirect addressing technique permits any location in a memory space having $2^M$ locations to be addressed using an N-bit bus, where M is greater than N. With the indirect addressing technique, the first step is to transmit N bits of address ("address R1") over the N-bit bus. The address R1 is used to identify a first register. Second, N bits of data ("Data 1") are transmitted over the bus and stored in a register. The register where Data 1 is stored is specified by address R1, that is, Data 1 is stored in the first register. The N bits of data, Data 1, define one byte.

The foregoing steps are repeated for a second byte. A second N bits of address ("address R2") are transmitted over the bus. The address R2 is used to identify a second register. A second N bits of data ("Data 2") are transmitted over the bus and stored in the register specified by address R2, that is, in the second register. The N bits of data, Data 2, define a second byte.

Two bytes of data (Data 1 and Data 2) are now stored in the first and second registers. The indirect addressing technique uses these two bytes to define an address in the system's $2^M$-bit memory space, an address which is two bytes (N+N bits) in length. The two bytes in the first and second registers are combined to define a complete address for addressing one of the $2^M$ memory locations in the memory space. Since the two bytes of "data" stored in the first and second register are used to define an address, they may also be referred to herein as "address-data bytes."

As described above, the prior art indirect addressing technique requires the transmission over the bus of at least two register addresses and at least two address-data bytes. With regard to references herein to the prior art indirect addressing technique, the phrases "address cycle" and "data cycle," are intended to refer, respectively, to the activities associated with transmitting a register or "data port" address, and the activities associated with transmitting a byte of address-data or other data. In the above example, using this terminology, two address cycles and two data cycles are required. Control signals, such as Address Enable and Write Enable, are conventionally used to define address and data cycles. With regard to the description of the preferred embodiments of the invention herein, the phrases "address cycle" and "data cycle" are intended to refer the activities there described.

After the two address-data bytes have been stored in the registers R1, R2, the CPU may perform either a read operation or a write operation, and the memory device uses the address-data bytes stored in the registers R1, R2 to perform the read/write operation. For example, a CPU can transmit a 16 bit address to a memory device using an 8-bit data bus by first transmitting an upper (or lower) address-data byte to the memory device during a first address cycle and a first data cycle, and then transmitting a lower (or upper) address-data byte during a second address cycle and a second data cycle. The CPU then transmits a data port address in an address cycle, and either writes data to or reads data from the location specified by the address in registers R1, R2 in a data cycle.

Using the indirect addressing technique to address a location in a memory space having $2^M$ addresses using an N-bit bus requires at least two, and maybe more, sets of address and data cycles. Further, to access a memory location after it has been addressed, requires an additional address cycle and data cycle. In general, as the size of the $2^M$ address memory space increases, that is, when M increases while N remains constant, more address and data cycles are required to indirectly address the memory space using the N-bit bus. In addition, for each new address, all of the aforementioned steps must be repeated. These constraints undesirably limit the speed of communication between the CPU and the memory. Accordingly, there is a need for a method and apparatus for high speed addressing of a memory space from a relatively small address space providing for faster communication with a memory device than has been available in the prior art.

SUMMARY OF THE INVENTION

The invention is directed to a method and apparatus for high speed addressing of a memory space from a relatively small address space. According to the invention, an N-bit bus interfaces with a memory device having a $2^M$ address memory space where M is greater than N. The method and apparatus provide for (a) providing at least two registers; (b) receiving one byte of a plurality of N-bit bytes that together define an address in the memory space; (c) incrementing a count as a result of completing step (b); (d) addressing one of the two registers according to the incremented count in step (c); and (e) storing the one byte in the register addressed in step (d).

The method and apparatus may further provide for receiving another byte of the plurality of bytes, resetting the count from step (c), addressing the other of the two registers as a result of the resetting the count, and then storing the other byte in the other register.

Alternatively, the method and apparatus may further provide for receiving another byte of the plurality of bytes, incrementing the count from step (c) to obtain a next incremented count, addressing the other of the two registers as a result of the next incremented count, and then storing the other byte in the other register.

In addition, one aspect of the invention is directed to a method and apparatus for high speed access of a memory space having $2^M$ addresses using an N-bit bus, where M is greater than N. According to the invention, at least two registers are provided, wherein each of the registers contains one of a plurality of N-bit bytes that together define an address in the memory space. A memory access command is received, and the memory space at the address is accessed as a result of said memory access command.

DETAILED DESCRIPTION OF A PREFERRED EMBODIMENT

The invention is described with reference to the Figures, and whenever possible, the same reference numbers are used in the Figures to refer to the same or like parts. Similarly, whenever possible, the same signal names are used to refer to the same or like signals.

Figure 1:
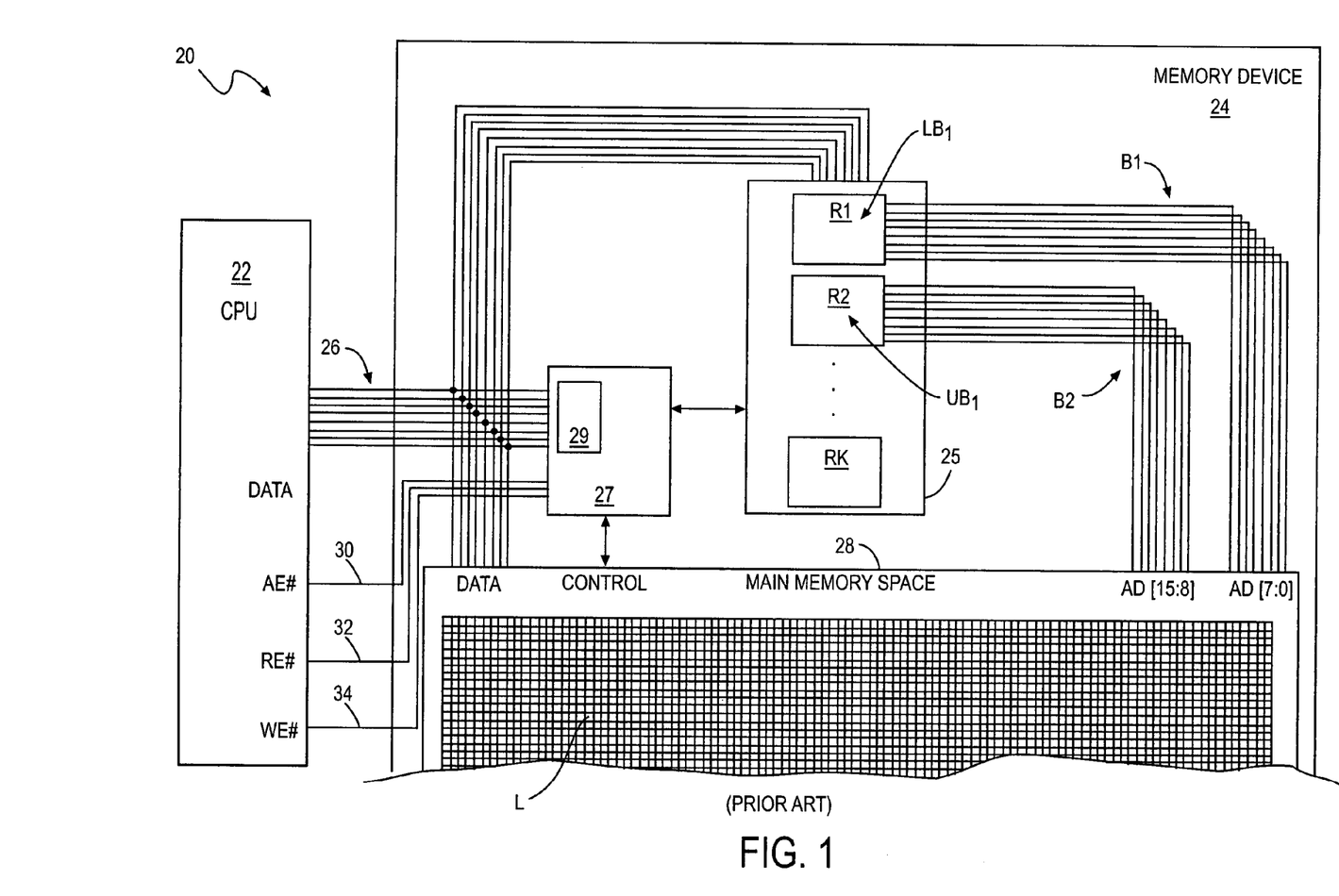
FIG. 1 is a schematic view of a prior art apparatus for addressing a memory space from a relatively small address space.

A preferred context of the invention is described with reference to FIG. 1, which employs a prior art methodology. FIG. 1 illustrates a system 20 for interfacing a CPU 22 and a memory device 24, such as may be used in a graphics display system for example. The memory device 24 includes a plurality of registers 25 (R1-RK) and a bus interface unit ("BIU") 27. To provide cost and power savings, the system 20 in this example employs an 8-bit data bus 26 that is also used as an address bus. The memory device 24, however, typically has an address space 28 (indicated as MAIN MEMORY SPACE) that requires more than 8 bits of address to be provided via address inputs [AD 15:0] over busses B1 and B2. In one preferred embodiment, a 16 bit address is required to uniquely identify each location in the address space 28. Accordingly, the memory device 24 must be indirectly addressed and the registers R1 and R2 in the memory device 24 are used to store an 8-bit lower address-data byte (LB) and an 8-bit upper address-data byte (UB), respectively, that are transmitted sequentially from the CPU 22 over the data bus 26.

The BIU 27 monitors the control signals on the lines 30, 32, and 34, and the data signals on the bus 26. In response to control and data signals, the BIU 27 may store the bits on the bus 26 in an internal register 29, provide internal signals to the registers 25 or the address space 28 for executing an instruction, or a combination of the foregoing.

Figure 2:
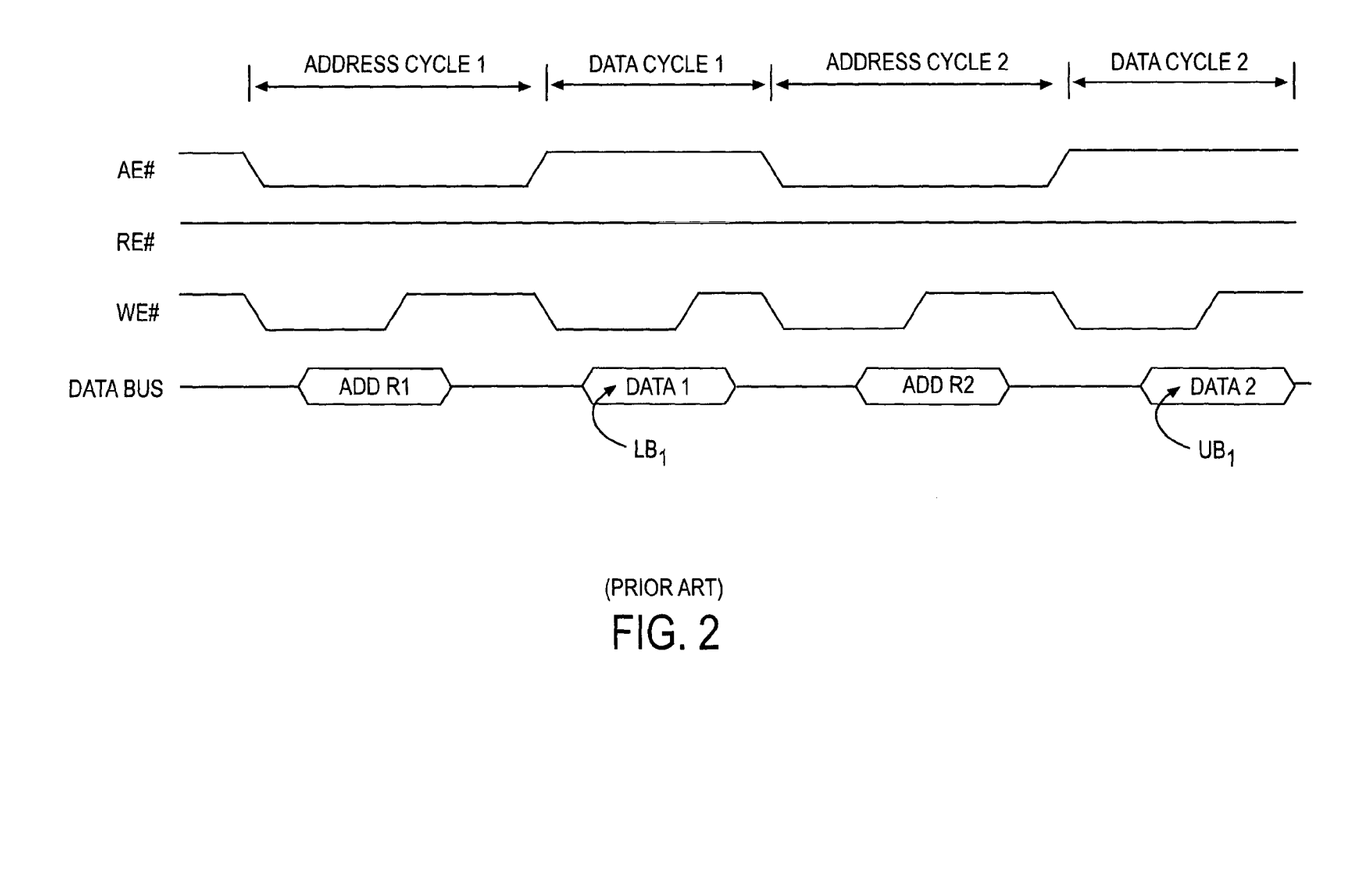
FIG. 2 is a timing diagram illustrating the operation of the apparatus of FIG. 1.

FIG. 2 is a timing diagram illustrating address and data cycles, and the operation of the memory device 24, as explained more fully below. An address cycle begins with assertion of both the Address Enable ("AE#") and Write Enable ("WE#") signals. (The # sign indicates that these signals are asserted when they are "low.") Further, a data cycle begins with the assertion of either the WE# signal or the Read Enable ("RE#") signal while the AE# signal is de-asserted.

The BIU 27 is adapted to cause the bits on the data bus 26 to be stored in the internal register 29 if it detects an address cycle. In addition, in a read data cycle or a write data cycle, the BIU 27 is adapted to cause bits on the data bus 26 to be stored, or bits to be placed on the data bus 26. In a data cycle, the address where data is stored at or retrieved from is determined by the contents of the internal register 29. In a write data cycle, if the contents of register 29 identify a register, the bits on the data bus 26 are written to that register. On the other hand, in a write data cycle, if the contents of register 29 identify a "data port address," the bits on the data bus 26 are written to the location in the memory space defined by the contents of registers 25, such as, for example R1, R2.

Referring to FIG. 2, in operation, the CPU 22 asserts AE# and WE# signals on lines 30, 34 and places the 8 bits (or fewer) defining the address of the register R1 ("ADD R1") on the data bus 26 in a first address cycle ("Address Cycle 1"). The Write Enable and Address Enable signals are de-asserted. The bits corresponding to ADD R1 are stored in internal register 29.

The Write Enable signal is asserted and the CPU 22 places 8 bits ("Data 1") on the data bus 26 in a first data cycle ("Data Cycle 1"). These 8 bits define a lower address-data byte $LB_1$ of the desired 16 bit address, corresponding to a location L in the main memory space 28. The Write Enable signal is de-asserted. The bits corresponding to $LB_1$ are stored in the address defined by the contents of internal register 29, that is, $LB_1$ is stored in register R1.

The CPU 22 asserts Address Enable and Write Enable signals and places the 8 bits (or fewer) defining the address of the register R2 ("ADD R2") on the data bus 26 in a second address cycle ("Address Cycle 2"). The Write Enable and Address Enable signals are de-asserted. The bits corresponding to ADD R2 are stored in internal register 29.

The Write Enable signal is asserted and the CPU 22 places 8 bits ("Data 2") on the data bus 26 in a second data cycle ("Data Cycle 2"). These 8 bits define an upper address-data byte $UB_1$ of the desired 16 bit address. The Write Enable signal is de-asserted. The bits corresponding to $UB_1$ are stored in the address defined by the contents of internal register 29, that is, $UB_1$ is stored in register R2.

The memory device 24 is adapted to join together or concatenate the upper byte UB and the lower byte LB to provide a 16-bit address in this example. This is shown in FIG. 1, for simplicity of illustration, by separate buses B1, B2 coupling the registers R1 and R2 to address inputs of main memory space 28. However, it will be appreciated by one skilled in the art that the upper byte UB and the lower byte LB may be concatenated in a variety of other ways. The complete 16-bit address may now be used by the memory device 24 to access the location L. The 16-bit address stored in registers R1, R2 may be used in either a read or a write memory access.

Figure 3:
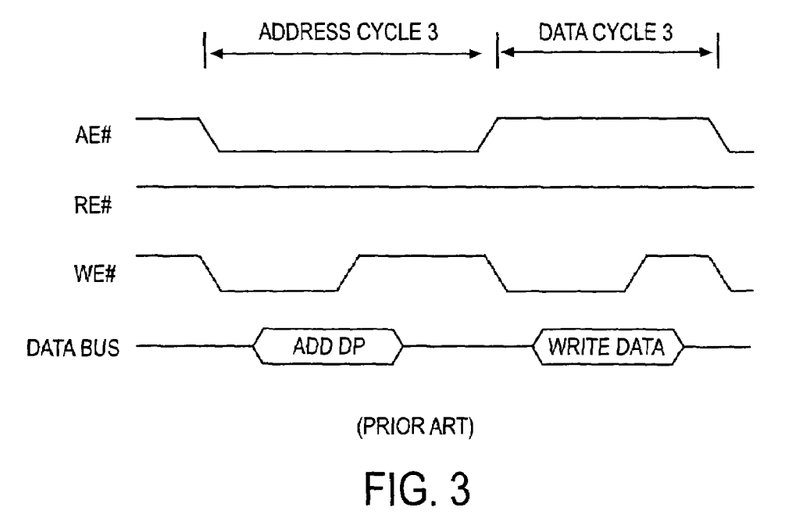
FIG. 3 is a timing diagram illustrating the operation of the apparatus of FIG. 1.

FIG. 3 shows the timing diagram for a write operation. The CPU 22 asserts AE# and WE#, places the data port address ("ADD DP") on the on the data bus 26 during an Address Cycle 3. The WE# signal is de-asserted. In a Data Cycle 3, the CPU 22 asserts WE#, places the data ("Write Data") on the data bus 26. The Data will be written to the address defined in registers R1, R2, that is, the address of the location L.

Figure 4:
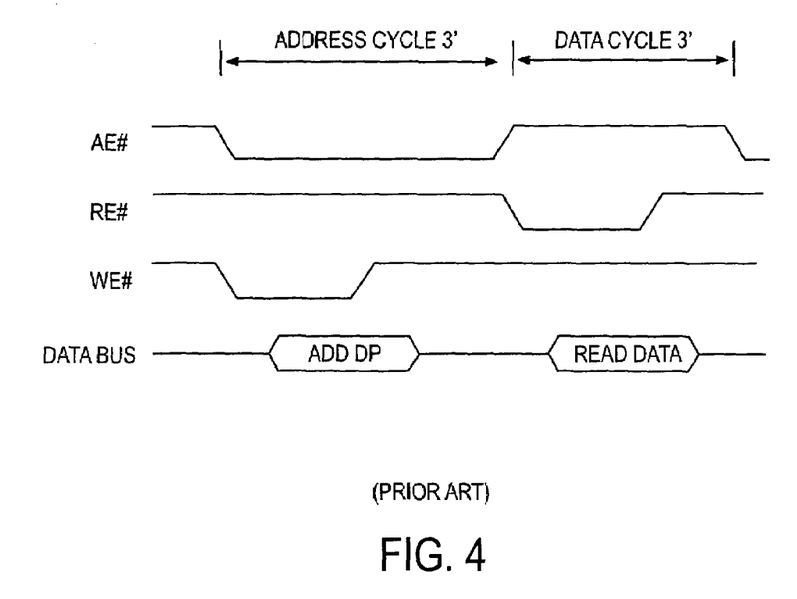
FIG. 4 is a timing diagram illustrating the operation of the apparatus of FIG. 1.

FIG. 4 shows the timing diagram for a read operation. The CPU 22 asserts AE# and WE#, places the data port address ("ADD DP") on the data bus 26 during an Address Cycle 3'. The WE# signal is de-asserted. In a Data Cycle 3', the CPU 22 asserts RE#, and reads the data ("Read Data") placed on the on the data bus 26 by the memory device 24. The Read Data will have been retrieved from the address defined in registers R1, R2, that is, the address of the location L.

Figure 5:
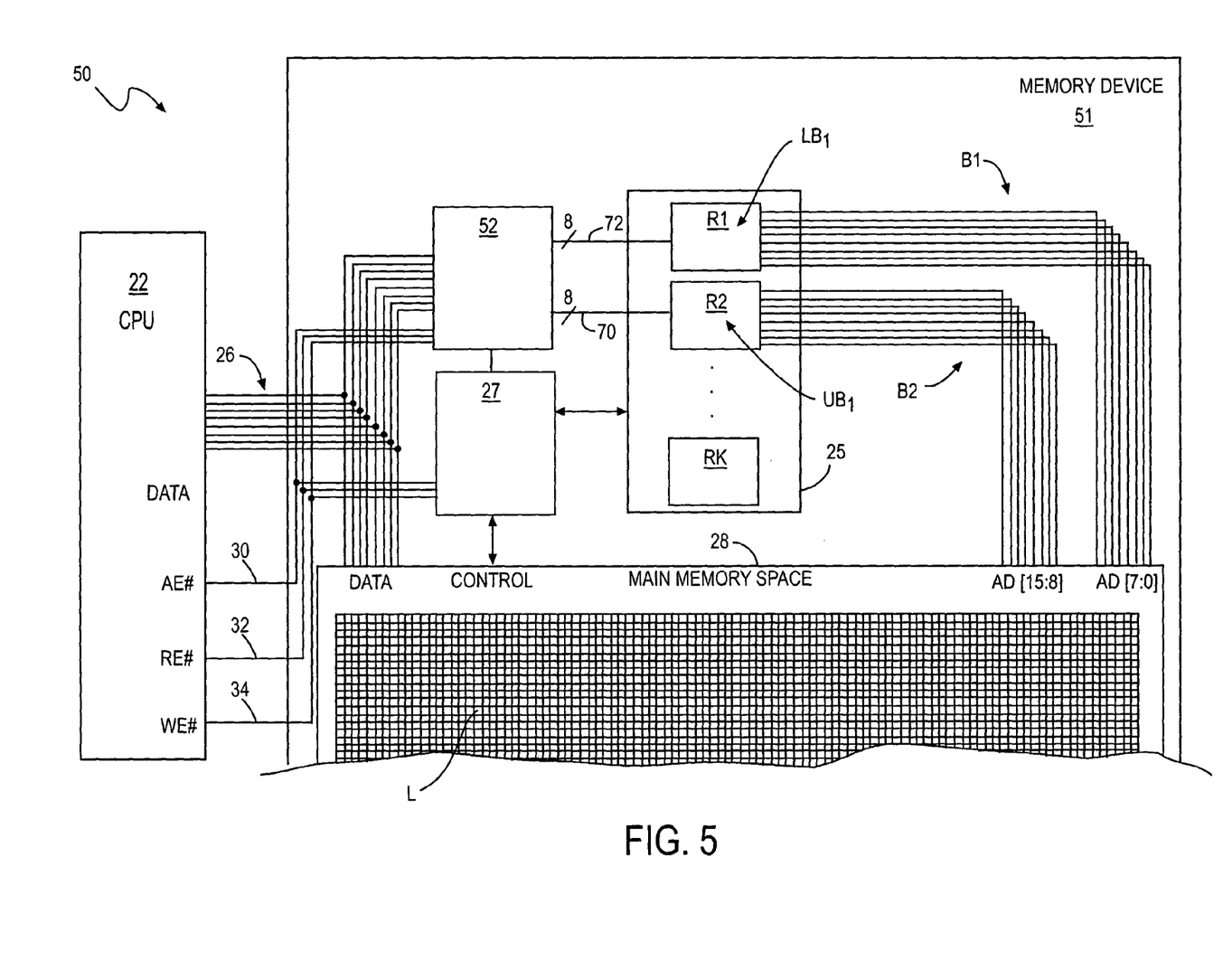
FIG. 5 is a schematic view of a preferred apparatus for high speed addressing of a memory space from a relatively small address space according to the invention.

Turning now to FIG. 5, an apparatus 50 for high speed addressing of a memory space from a relatively small address space according to the invention is shown. The apparatus 50 includes a logic circuit 52 that alters the operation described above. More particularly, the registers R1 and R2 are under the control of the logic circuit 52. The apparatus 50 includes a CPU 22, a memory device 5 1, such as may be used in a graphics display system for example, and in order to provide cost and power savings, an 8-bit data bus 26 that is also used as an address bus. The memory device 51, however, typically has an address space 28 (indicated as MAIN MEMORY SPACE) that requires more than 8 bits to address all locations within the space.

The logic circuit 52 includes hardware, software, firmware, or a combination of these components that recognizes that the assertion of the AE# signal together with the assertion of the WE# signal indicates that the CPU 22 intends to transmit a first address-data byte, e.g., a lower address-data byte LB. The circuit 52 automatically addresses register R1 and causes this byte to be stored in register R1. Moreover, the circuit 52 recognizes that a subsequent assertion of the AE# and WE# signals indicates that the CPU 22 intends to transmit another address-data byte, e.g., an address-data byte UB. The circuit 52 automatically addresses register R2 and causes this byte to be stored in register R2.

Figure 6:
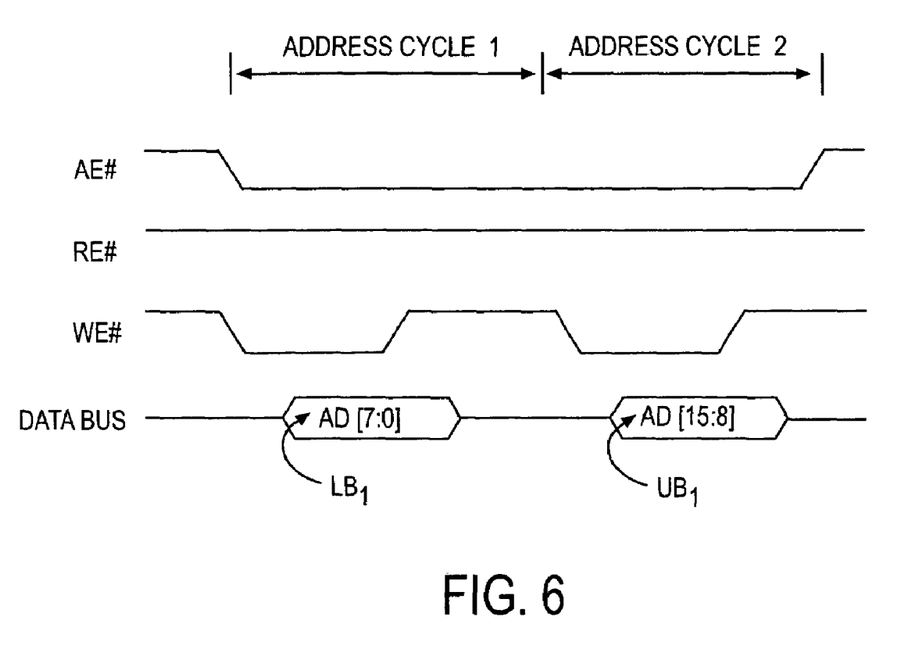
FIG. 6 is a timing diagram illustrating the operation of the apparatus of FIG. 5.

Referring to FIG. 6, a timing diagram illustrating the operation of one preferred embodiment of the apparatus 50 is shown. Particularly, for comparison with the example above, the address cycles used to write the address of the registers R1 and R2 are eliminated. Rather, according to the invention, the CPU 22 asserts the AE# and WE# signals, and places 8 bits on the data bus 26 in a first data cycle ("Address Cycle 1"). These 8 bits define a lower address-data byte $LB_1$ (AD [7:0]) of the desired 16-bit address and correspond to a location L in the main memory space 28. The CPU 22 de-asserts WE#. The CPU 22 asserts the AE# and WE# signals, and places 8 bits on the data bus 26 in a second data cycle ("Address Cycle 2"). These 8 bits define an upper address-data byte $UB_1$ (AD [15:8]) of the desired 16-bit address.

As in the prior art, the memory device 24 is adapted to concatenate the upper byte $UB_1$ and the lower byte $LB_1$ to provide a complete address, which may now be used by the memory device 24 to access the location L. As in FIG. 1, separate buses B1, B2 couple the registers R1 and R2 to the address inputs of main memory space 28, and, as before, this method is shown for simplicity of illustration and it is contemplated that the upper byte UB and the lower byte LB may be concatenated in any manner known in the art. The 16-bit address stored in registers R1, R2 may be used in either a read or a write memory operation.

Figure 9:
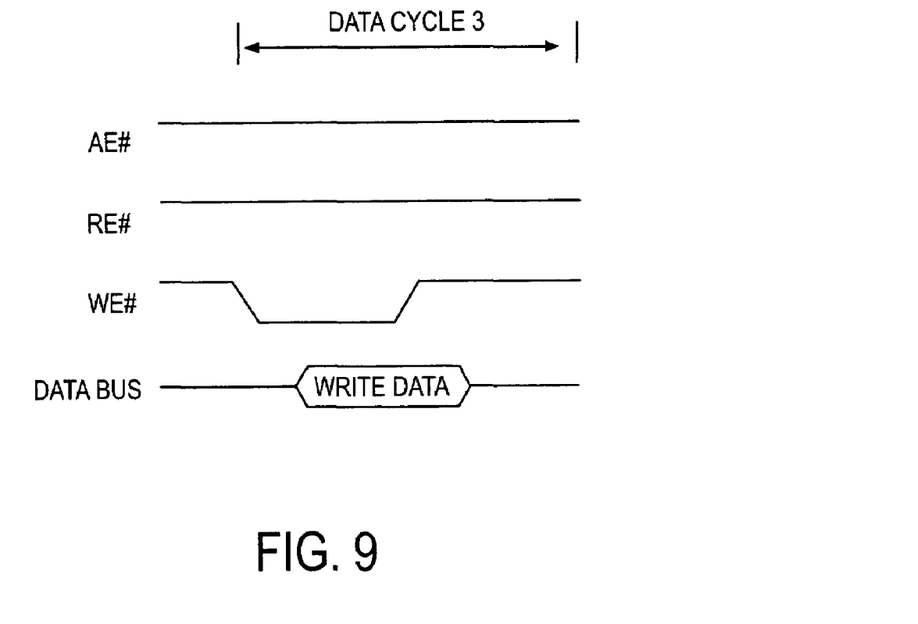
FIG. 9 is a timing diagram illustrating the operation of the apparatus of FIG. 5.
Figure 10:
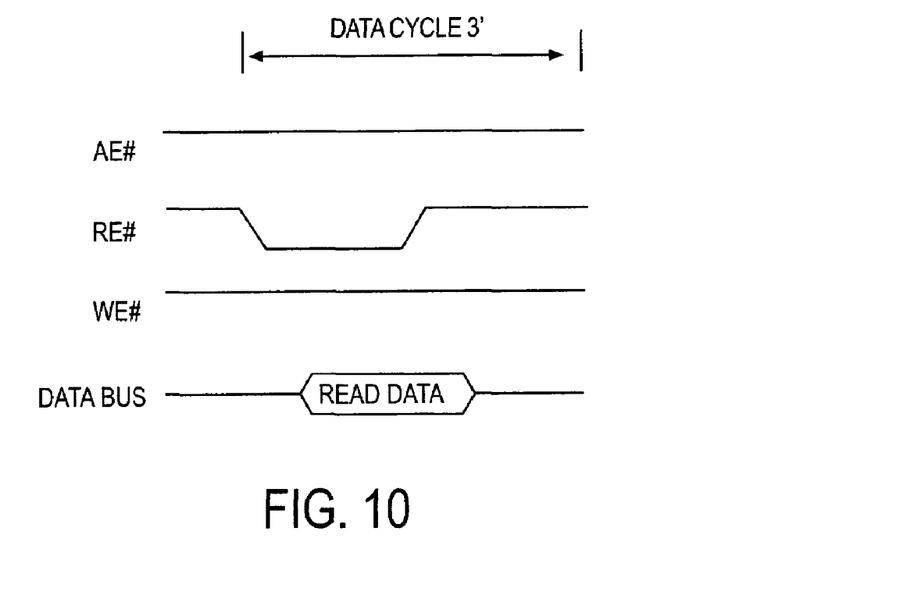
FIG. 10 is a timing diagram illustrating the operation of the apparatus of FIG. 5.

It will be recalled that in the prior art, a memory access requires an operation in which the address of the data port is placed on the data bus, as shown in FIGS. 3-4 as address cycles 3, 3'. In contrast, the memory devices 51, 56, and 60, according to the invention, are adapted to perform a memory access without the need to first perform the operation represented by the address cycle 3 and 3' in FIGS. 3-4. According to the invention, a memory access may occur immediately subsequent to the storage of a complete address for a location L in the registers R1-RK. In other words, once a memory location L has been addressed, a memory access may immediately occur without the need for an operation signaling the location where the address of the location L is stored. According to the invention, the memory access is based on a command from the CPU 22. In one preferred embodiment, a memory access results from the assertion of either the WE# signal or the RE# signal while the AE# signal is de-asserted. Preferably, a memory access is based entirely on such a command. For example, referring to FIGS. 6 and 9, a write data cycle 3 may occur immediately subsequent to the address cycle 2. Alternatively, referring to FIGS. 6 and 10, a read data cycle 3' may occur immediately subsequent to the address cycle 2.

The read or a write memory operation that is performed after the memory location L has been addressed differs in another important respect from the prior art. As described below, in one preferred embodiment, a counter is employed to automatically the address the registers R1, R2, . . . RN. The logic circuit 52 further includes hardware, software, firmware, or a combination of these components that recognizes that the counter should be reset if a particular command is received. In particular, the logic circuit 52 preferably recognizes that the counter should be reset if both: (1) the AE# signal is not asserted; and (2) either the RE# signal or the WE# signal is asserted.

Referring to FIGS. 5 and 6, additional preferred embodiments of apparatus for high speed addressing of a memory space from a relatively small address space according to the invention are shown. These preferred embodiments are similar to that depicted in FIG. 5. In FIG. 5, logic circuit 54 corresponds to circuit 52, and employs a 1-bit counter 64 for automatically addressing registers R1, R2. A more general logic circuit 58, which corresponds to one preferred embodiment of the circuit 52, employs a K-bit counter 66 for performing this addressing function and is suitable for use with the additional registers R1-RK shown in FIG. 8.

Figure 7:
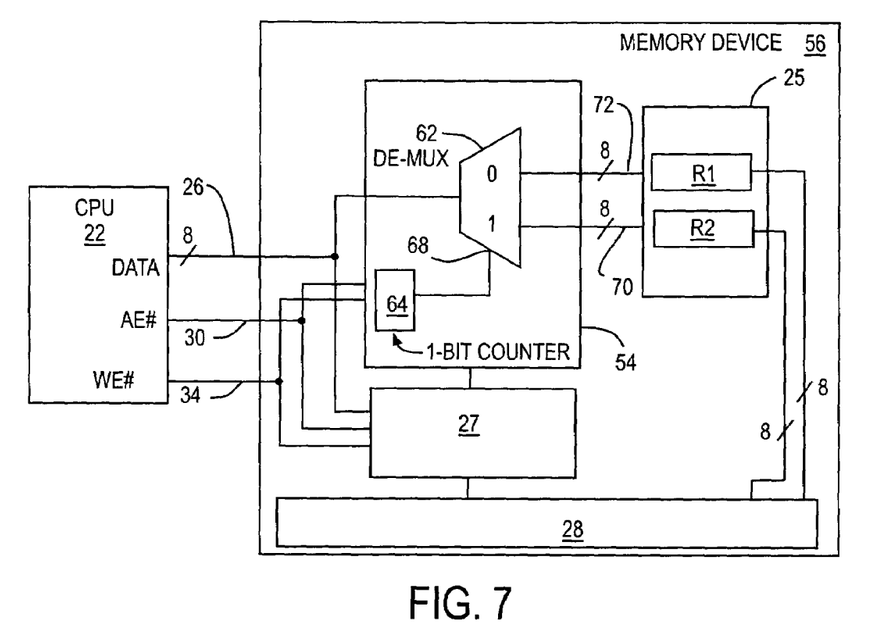
FIG. 7 is a schematic view of one preferred alternative embodiment of an apparatus for high speed addressing of a memory space from a relatively small address space according to the invention.

In FIG. 7, the 1-bit counter 64 is coupled to the select input 68 of a de-multiplexer 62 that toggles between the output buses 70 and 72 which are coupled, respectively, to the registers R1 and R2. The input of the de-multiplexer 62 is coupled to the 8-bit data bus 26. The counter 64 increments a count, and then resets the count to zero. For example, the counter 64 is initially reset to zero, and when the CPU 22 writes a first address-data byte, it is stored in register R1 because the select input 68 of the demultiplexer 62 is zero. The counter 64 then increments to 1 so that when the CPU 22 writes a second address-data byte, it will be stored in the register R2. After the CPU 22 writes the second address-data byte, the counter 64 is reset to zero. Alternatively, the counter 64 is reset to zero when the CPU 22 performs a subsequent data cycle 3, 3', such as those shown in FIGS. 9-10.

Figure 8:
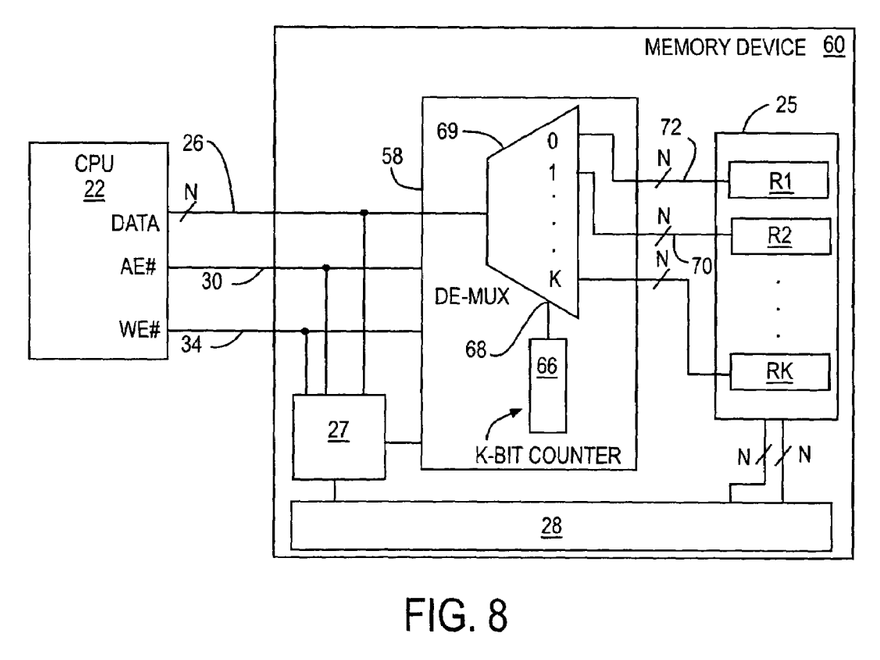
FIG. 8 is a schematic view of another alternative preferred embodiment of an apparatus for high speed addressing of a memory space from a relatively small address space according to the invention.

On the other hand, referring to FIG. 8, the memory device 60 has a $2^M$ bit memory space and is coupled to the CPU 22 by the N-bit data bus 26. A K-bit counter 66 is coupled to the select input 68 of a de-multiplexer 69. The K-bit counter 66 increments the count until K registers have been addressed, that is, until $R_1$ through $R_K$ have been addressed. The memory device 60 is adapted to join together or concatenate the address-data-bytes stored in registers $R_1$ through $R_K$ to provide a complete address, which may be used by the memory device 60 to access any memory location L within its memory space. In a manner similar to the embodiment of FIG. 7, the K-bit counter 66 is reset to zero after the CPU 22 writes the $K^{th}$ address-data byte. Alternatively, the counter 66 is reset to zero when the CPU 22 performs a data cycle 3 or 3' (such as those shown in FIGS. 9-10), subsequent to the required K address cycles, such as those shown in FIG. 6. Alternative implementations will be recognized by persons of ordinary skill.

As indicated above, an outstanding advantage of the invention is that a CPU 22, using an N-bit data bus 26 addressing a memory device 51, 56, 60 having a $2^M$ bit memory space where M is greater than N, consumes fewer "cycles" than was formerly required. Since the CPU 22 is clocked, address and data cycles consume a predetermined number of clock cycles and therefore a predetermined amount of time that cannot be reduced by any action taken by the CPU 22. On the other hand, the present invention when implemented outside of the CPU 22 permits reducing the time required to address the registers R1 and R2 to bare minimum amounts by eliminating formerly required cycles.

The use of an 8-bit bus and 8-bit bytes in the examples is arbitrary. Further, the use of Address Enable and Write Enable signals to inform a logic circuit that the CPU intends to send an address-data-byte is also arbitrary. The use of other bus widths, byte lengths, and signals are contemplated. It is further to be recognized that, while a specific method and apparatus for high speed addressing of a memory space from a relatively small address space has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims that follow.

The invention claimed is:

1. A method for accessing a device by a host using a dedicated bus, the device having up to $2^M$ memory locations, the bus having N data lines and at least two control lines, wherein M is greater than N, and the host performs an address cycle by asserting a first control signal and a data cycle by de-asserting the first control signal, comprising:
   (a) performing a first address cycle to transmit a first address portion over the bus during the first address cycle;
   (b) storing the first address portion in a first register of the device in response to detecting the first address cycle;
   (c) performing a second address cycle to transmit a second address portion over the bus during the second address cycle;
   (d) storing the second address portion in a second register of the device in response to detecting the second address cycle;
   (e) performing a first data cycle if the first and second address portions, when combined, form a first address for one of the memory locations;
   (f) if the first data cycle is a write data cycle, transmitting a first datum from the host to the device during the first data cycle, and storing the first datum at the first address in response to detecting the first data cycle; and
   (g) if the first data cycle is a read data cycle, transmitting a second datum from the device to the host during the first data cycle in response to detecting the first data cycle, the second datum being stored at the first address, wherein the second address cycle is immediately subsequent to the first address cycle, and the first data cycle is immediately subsequent to the second address cycle.

2. The method of claim 1, wherein N equals eight and M equals sixteen.

3. The method of claim 1, further comprising, if the first and second address portions, when combined, are insufficient to form a first address:
   (a) performing a third address cycle to transmit a third address portion over the bus during the third address cycle;
   (b) storing the third address portion in a third register of the device in response to detecting the third address cycle; and
   (c) performing the first data cycle if the first, second, and third address portions, when combined, form a first address for one of the memory locations, wherein the third address cycle is immediately subsequent to the second address cycle, and the first data cycle is immediately subsequent to the third address cycle.

4. A device, comprising:
   at least two registers, each register to store a distinct N-bit address-byte of a plurality of address-bytes that together define an address in a memory space having $2^M$ addresses, each register associated with a particular count of address-bytes received on a dedicated bus for coupling the device and a processor, the bus having N data lines and at least two control lines, where M is greater than N;
   a memory having a plurality of memory locations; and
   a unit to monitor control signals placed on the bus by the processor, the unit including:
   (a) a K-bit address-byte-received counter to count address-bytes received on the bus by counting each assertion of an address transfer signal on a first control line, wherein the number of the at least two registers is less than or equal to $2^K$,
   (b) a selecting unit to select one of the at least two registers according to a count of the address-byte-received counter, wherein the selecting unit selects a distinct one of the at least two registers for a particular count value of the address-byte-received counter,
   (c) first logic to store an address-byte received on the bus in a currently selected register and to combine address-bytes stored in the at least two registers to form an address for one of the memory locations in response to detecting an assertion of the address transfer signal, and
   (d) second logic to store a data-byte received on the bus at the address in response to detecting a de-assertion of the address transfer signal and assertion of a write signal, to fetch a data-byte stored at the address from the memory in response to detecting a de-assertion of the address transfer signal and assertion of a read signal, and to reset the address-byte received counter in response to detecting a de-assertion of the address transfer signal and assertion of one of the write or read signals.

5. The apparatus of claim 4, wherein N equals eight and M equals sixteen.

6. A machine readable medium embodying a program of instructions for execution by a machine to perform a method for accessing a device by a host using a dedicated bus, the device having up to $2^M$ memory locations, the bus having N data lines and at least two control lines, wherein M is greater than N, and the host performs an address cycle by asserting a first control signal and a data cycle by de-asserting the first control signal, comprising:
  (a) performing a first address cycle to transmit a first address portion over the bus during the first address cycle;
  (b) storing the first address portion in a first register of the device in response to detecting the first address cycle;
  (c) performing a second address cycle to transmit a second address portion over the bus during the second address cycle;
  (d) storing the second address portion in a second register of the device in response to detecting the second address cycle;
  (e) performing a first data cycle if the first and second address portions, when combined, form a first address for one of the memory locations;
  (f) if the first data cycle is a write data cycle, transmitting a first datum from the host to the device during the first data cycle, and storing the first datum at the first address in response to detecting the first data cycle; and
  (g) if the first data cycle is a read data cycle, transmitting a second datum from the device to the host during the first data cycle in response to detecting the first data cycle, the second datum being stored at the first address, wherein the second address cycle is immediately subsequent to the first address cycle, and the first data cycle is immediately subsequent to the second address cycle.

7. The machine readable medium of claim 6, wherein N equals eight and M equals sixteen.

8. The machine readable medium of claim 6, further comprising, if the first and second address portions, when combined, are insufficient to form a first address:
  (a) performing a third address cycle to transmit a third address portion over the bus during the third address cycle;
  (b) storing the third address portion in a third register of the device in response to detecting the third address cycle; and
  (c) performing the first data cycle if the first, second, and third address portions, when combined, form a first address for one of the memory locations, wherein the third address cycle is immediately subsequent to the second address cycle, and the first data cycle is immediately subsequent to the third address cycle.

9. A system, comprising:
a central processing unit;
a device having:
  at least two registers, each register to store a distinct N-bit address-byte of a plurality of address-bytes that together define an address in a memory space having $2^M$ addresses;
  a memory having a plurality of memory locations;
  a unit to monitor control signals placed on the bus by the central processing unit, the unit including:
  (a) a K-bit address-byte-received counter to count address-bytes received on a bus by counting each assertion of an address transfer signal on a first control line, wherein the number of the at least two registers is less than or equal to $2^K$,
  (b) a selecting unit to select one of the at least two registers according to a count of the address-byte-received counter, wherein the selecting unit selects a distinct one of the at least two registers for a particular count value of the address-byte-received counter,
  (c) first logic to store an address-byte received on the bus in a currently selected register and to combine address-bytes stored in the at least two registers to form an address for one of the memory locations in response to detecting an assertion of the address transfer signal, and
  (d) second logic to store a data-byte received on the bus at the address in response to detecting a de-assertion of the address transfer signal and assertion of a write signal, to fetch a data-byte stored at the address from the memory in response to detecting a de-assertion of the address transfer signal and assertion of a read signal, and to reset the address-byte received counter in response to detecting a de-assertion of the address transfer signal and assertion of one of the write or read signals; and
the bus to exclusively couple the central processing unit and the device, the bus having N data lines and at least two control lines, where M is greater than N.

10. The system of claim 9, wherein N equals eight and M equals sixteen.

* * * * *